UNITED STATES PATENT OFFICE.

ROBERT W. TURNER, OF DUBLIN, TEXAS.

PROCESS OF TANNING.

SPECIFICATION forming part of Letters Patent No. 461,108, dated October 13, 1891.

Application filed October 21, 1890. Serial No. 368,848. (No specimens.)

*To all whom it may concern:*

Be it known that I, ROBERT W. TURNER, a citizen of the United States, residing at Dublin, in the county of Erath, State of Texas, have invented certain new and useful Improvements in Tanning, of which the following is a specification.

This invention relates to certain new and useful improvements in tanning, and the novelty thereof will be particularly pointed out in the following description, and specifically defined in the appended claims.

I have discovered that the broom-weed, (*Amphiachyris dracunculoides*,) which abounds on the prairies, especially in western Texas, possesses valuable qualities for tanning purposes. I have found that it can with little expense or trouble be utilized for tanning without the use of other ingredients.

In carrying out my invention I take the broom-weed and macerate it in any suitable manner, and while in this condition it is placed in a suitable vessel and a jet of steam is turned in at the bottom of the vessel until the weed has been sufficiently cooked or steamed, and as the steam is gradually condensed the liquid becomes sufficiently heated to draw out the strength of the weed. The liquor is then drawn off and placed in a steam-condenser and reduced to almost a sirup, and in this condition it may be barreled up for future use.

The leather to be tanned, preferably after depilating, is first introduced into a diluted bath of sufficient strength, varying according to the character of the hides being treated, of this extract or decoction and allowed to remain there a short time, when it is placed in a vat or vats containing a sufficiently-strong solution or extract and allowed to remain there from twelve to thirty-six hours. The extract in the last-mentioned vat is preferably kept warm by steam or otherwise. After the skins are taken out of this strong extract they are dressed off, oiled, and otherwise treated, as may be desired.

Other tanning ingredients may be used with the broom-weed; but it is designed to use the weed alone, treated as above, chemicals not being required, and it will be seen that I utilize what has heretofore been of little or no value, but, rather, a nuisance, but which, when used substantially as above specified, makes a strong if not the strongest and cheapest tanning infusion of vegetable growth, and which is much cheaper than bark, while the leather produced by it is stronger, tougher, better, softer, and more pliable, and the process of production more rapid and cheaper than practicable with other tanning solutions or materials.

What I claim as new is—

1. The within-described process of tanning hides or skins, which consists in steeping the same in an infusion of the plant *Amphiachyris dracunculoides*, substantially as specified.

2. As an improvement in the treatment of skins or hides, the process herein described, which consists in the subjection of the same to the action first of a weak solution and subsequently to that of a strong solution of infusion of the plant *Amphiachyris dracunculoides*, substantially as specified.

In testimony whereof I affix my signature in presence of two witnesses.

ROBERT W. TURNER.

Witnesses:
JNO. H. LATHAM,
J. J. MCLIMORE.